(12) United States Patent
Singh et al.

(10) Patent No.: US 10,887,641 B2
(45) Date of Patent: Jan. 5, 2021

(54) TECHNIQUES TO DYNAMICALLY CONFIGURE A SENDER BITRATE FOR STREAMING MEDIA CONNECTIONS

(71) Applicant: WhatsApp Inc., Menlo Park, CA (US)

(72) Inventors: Manpreet Singh, Los Altos Hills, CA (US); YuanYuan Wang, Sunnyvale, CA (US); Shruthi Murthy, Palo Alto, CA (US); Jonathan Sheller, San Francisco, CA (US)

(73) Assignee: WHATSAPP INC., Menlo Park, CA (US)

( * ) Notice: Subject to any disclaimer, the term of this patent is extended or adjusted under 35 U.S.C. 154(b) by 136 days.

(21) Appl. No.: 15/813,648

(22) Filed: Nov. 15, 2017

(65) Prior Publication Data

US 2019/0149868 A1 May 16, 2019

(51) Int. Cl.
*H04N 21/226* (2011.01)
*H04N 21/2343* (2011.01)
*H04N 21/236* (2011.01)
*H04N 21/24* (2011.01)
*H04N 21/262* (2011.01)
*H04N 21/442* (2011.01)
*H04N 21/462* (2011.01)
*H04N 21/6373* (2011.01)
*H04N 21/6375* (2011.01)
*H04N 21/647* (2011.01)
*H04N 21/2662* (2011.01)
(Continued)

(52) U.S. Cl.
CPC ....... *H04N 21/2662* (2013.01); *H04N 19/154* (2014.11); *H04N 19/184* (2014.11); *H04N 21/25808* (2013.01)

(58) Field of Classification Search
None
See application file for complete search history.

(56) References Cited

U.S. PATENT DOCUMENTS

2002/0116154 A1* 8/2002 Nowak .................... H04L 41/12
702/186
2006/0239204 A1* 10/2006 Bordonaro ............ H04L 43/087
370/253

(Continued)

*Primary Examiner* — John R Schnurr
*Assistant Examiner* — Jean D Saint Cyr
(74) *Attorney, Agent, or Firm* — Kacvinsky Daisak Bluni PLLC

(57) ABSTRACT

Techniques to dynamically configure a sender bitrate for streaming media connections are described. In one embodiment, an apparatus may comprise a media component operative to generate a media stream at a sending client device, the media stream comprising a video stream and an audio stream, the media stream configured for a sending bitrate; and modifying the sending bitrate based on a receiver-side bitrate value; a network component operative to send the media stream to a receiving client device; and a bitrate determination component operative to receive the receiver-side bitrate value from the receiving client device, the receiver-side bitrate value based on a first network performance measure and a second network performance measure, the first network performance measure based on the video stream in isolation from the audio stream, the second network performance measure based on the audio stream in isolation from the video stream. Other embodiments are described and claimed.

19 Claims, 11 Drawing Sheets

(51) Int. Cl.
*H04N 21/258* (2011.01)
*H04N 19/154* (2014.01)
*H04N 19/184* (2014.01)

(56) References Cited

U.S. PATENT DOCUMENTS

| | | | |
|---|---|---|---|
| 2008/0189429 A1* | 8/2008 | DaCosta | H04L 65/80 |
| | | | 709/231 |
| 2012/0179811 A1* | 7/2012 | Eicken | H04L 43/00 |
| | | | 709/224 |
| 2013/0034146 A1* | 2/2013 | Jeong | H04N 19/166 |
| | | | 375/240.01 |
| 2013/0198767 A1* | 8/2013 | Wang | H04L 65/80 |
| | | | 725/14 |
| 2013/0230043 A1* | 9/2013 | Anandakumar | H04L 1/0007 |
| | | | 370/352 |
| 2014/0022928 A1* | 1/2014 | Zingale | H04L 41/142 |
| | | | 370/252 |
| 2016/0301601 A1* | 10/2016 | Anand | H04L 69/22 |

* cited by examiner

TECHNIQUES TO DYNAMICALLY CONFIGURE A SENDER BITRATE FOR STREAMING MEDIA CONNECTIONS

BACKGROUND

Users of mobile devices, such as smartphones, may use their mobile devices to execute applications. These applications may perform communications and network tasks on behalf of their user. An application may comprise a messaging client for communication between users. This communication may include the transmission of streaming content, including streaming combined video and audio content such as a video call exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to dynamically configure a sender bitrate for streaming media connections. Some embodiments are particularly directed to techniques to dynamically configure a sender bitrate for streaming media connections using both sender-side and receiver-side performance information. In one embodiment, for example, an apparatus may comprise a media component operative to generate a media stream at a sending client device, the media stream comprising a video stream and an audio stream, the media stream configured for a sending bitrate; and modifying the sending bitrate based on a receiver-side bitrate value; a network component operative to send the media stream to a receiving client device; and a bitrate determination component operative to receive the receiver-side bitrate value from the receiving client device, the receiver-side bitrate value based on a first network performance measure and a second network performance measure, the first network performance measure based on the video stream in isolation from the audio stream, the second network performance measure based on the audio stream in isolation from the video stream. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
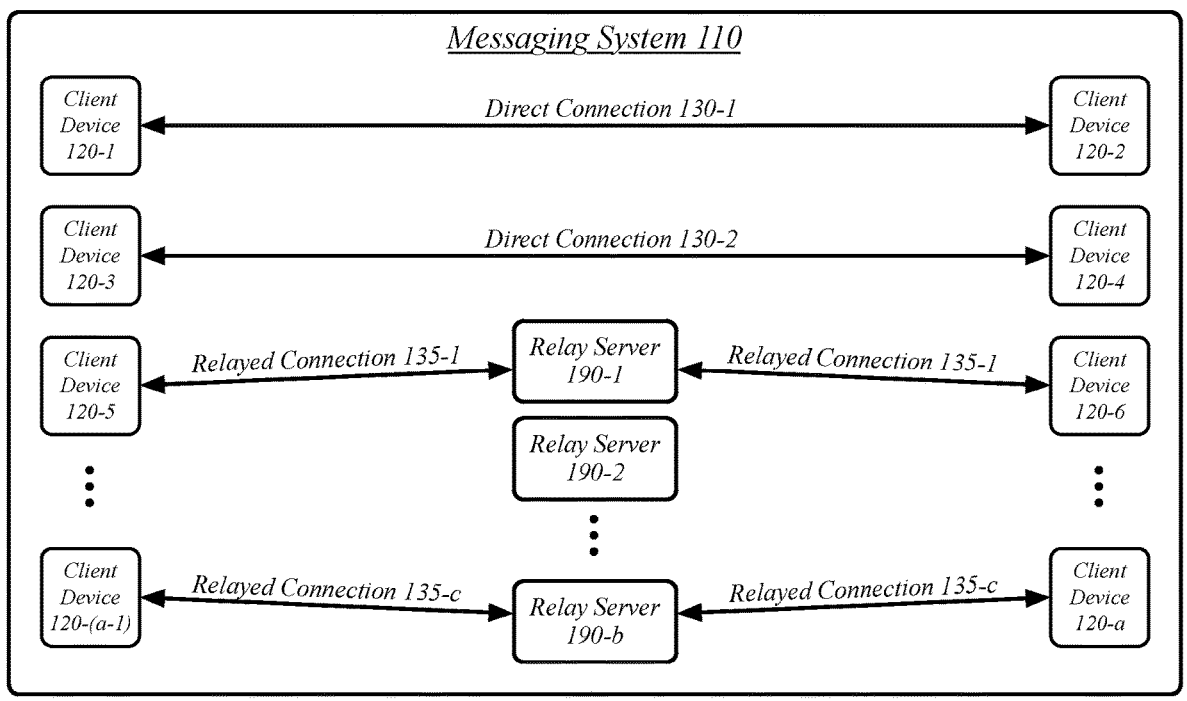
FIG. 1 illustrates an embodiment of a streaming media system.

Users may stream media content from their devices. This may include media content captured locally on a mobile device, for instance, the streaming of live audio and video during a video call. It may also include media content stored on the mobile device, such as a video stored locally.

The streaming of media content may be performed based on the assignment of a target bitrate to a media component responsible for the encoding of the streaming media content within limits based on the target bitrate. The media content may be encoded in order to fit within the limit defined by the target bitrate, with the target bitrate thereby serving as a maximum limit for the encoding of media content. This target bitrate may be determined based on the gathering of network performance information in order to prevent overwhelming a network connection. An overwhelmed network connection may result in delay or periodic interruption in the delivery of the media content, which may result in unsatisfactory playback of the media content, particularly where the media content is immediate and live and particularly where the media content is part of an interactive exchange (e.g., an interactive audio or video call).

As a result, the embodiment can improve the performance and user experience of exchanging streaming media content between devices. These embodiments may be particularly useful in which one or more of the devices are operating on network of marginal capability for streaming network content, such as cellular data networks. While the embodiments may be appropriate for the transmission of live-captured media content, they may also be applied to the streaming of pre-recorded media content, particularly where that pre-recorded media content is encoded, re-encoded, or transcoded in parallel with the transmission of the media content such that its encoding parameter(s) may be adjusted based on network performance.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a streaming media system 100. In one embodiment, the streaming media system 100 may comprise a computer-implemented system having software applications comprising one or more components. Although the streaming media system 100 shown in FIG. 1 has a limited number of elements in a certain topology, it may be appreciated that the streaming media system 100 may include more or less elements in alternate topologies as desired for a given implementation.

A messaging system 110 may be generally arranged to receive, store, and deliver messages. The messaging system 110 may store messages while messaging clients, such as may execute on client devices 120 are offline and deliver the messages once the messaging clients are available. The messaging system 110 may empower the engagement and performance of other communication tasks, such as audio and/or video calls.

A plurality of client devices 120 may operate as part of the streaming media system 100, transmitting messages and otherwise communicating between each other as part of a messaging system 110. The client devices 120 may execute messaging clients for the messaging system 110, wherein each of the client devices 120 and their respective messaging clients are associated with a particular user of the messaging system 110. In some embodiments, the client devices 120 may be cellular devices such as smartphones and may be identified to the messaging system 110 based on a phone number associated with each of the client devices 120. In some embodiments, the client devices 120 may be identified to the messaging system 110 based on a user account registered with the messaging system 110—and potentially a social networking system that comprises or is associated with the messaging system 110—and logged into from the messaging client executing on the client devices 120. In general, each messaging client may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a messaging system 110 using web browser accessing a web server, for instance.

Streaming network connections within the messaging system 110 may be performed directly or via relay servers 190. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay server provided as part of the messaging system 110, the relay server then forwarding the network packets to the destination client device. Relay servers 190 may be used, for instance, to bridge NAT devices that are not configured to sufficiently expose a destination client device for the performance of a direct connection.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Streaming media system 100 may include an authorization server (or other suitable component(s)) that allows users to opt in to or opt out of having their actions logged by streaming media system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of streaming media system 100 and other elements of a messaging system through blocking, data hashing, anonymization, or other suitable techniques as appropriate. For instance, a user may be empowered to configure privacy settings determining whether network usage, such as streaming communication, is logged by the streaming media system 100 and analyzed. In some embodiments, a user may be presented with information regarding may be collected and how that information may be used, such as informing the user that collected information may be anonymized prior to analysis.

Figure 2:
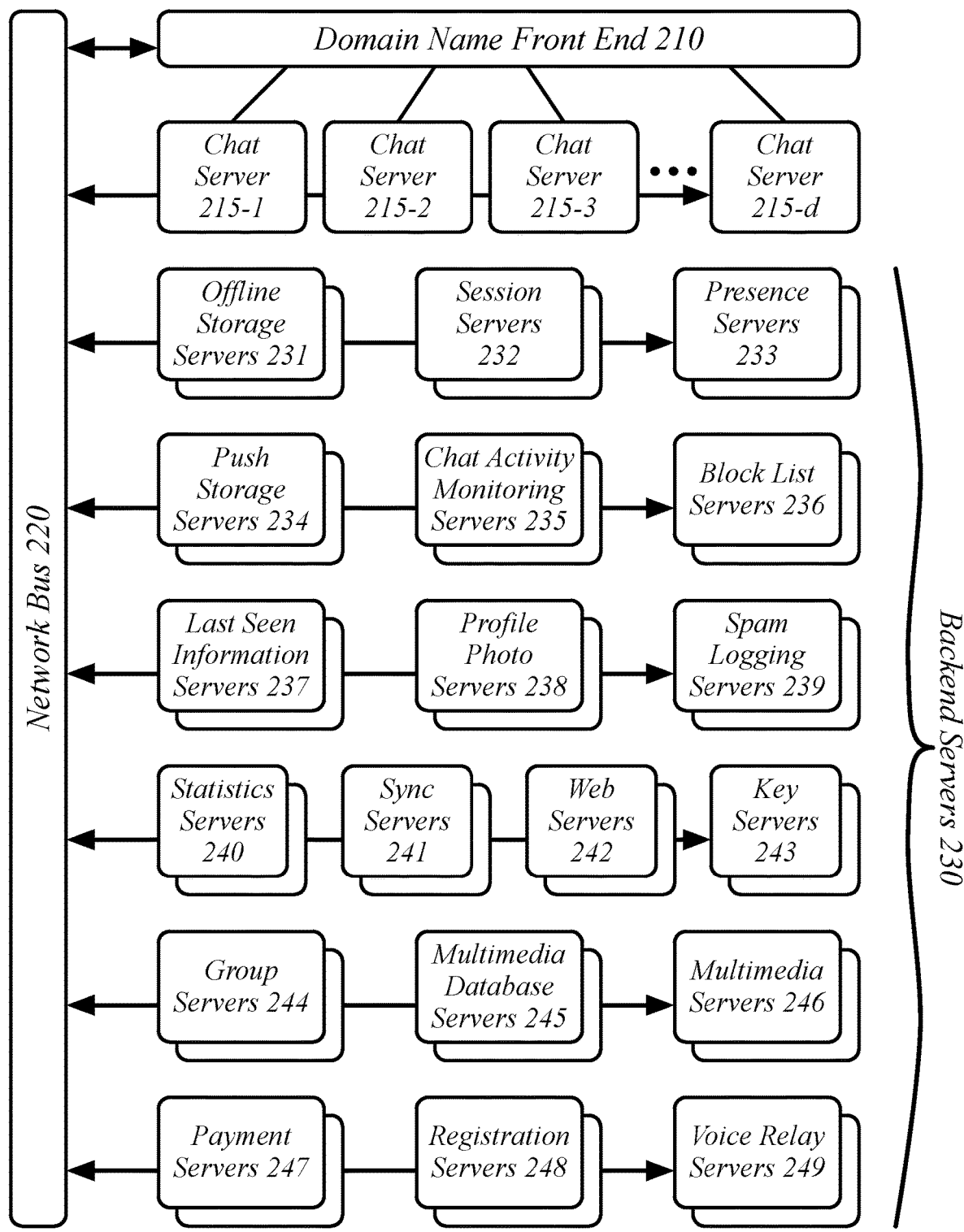
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the streaming media system 100 with the operations of the streaming media system 100 comprising a portion of the overall operations of the messaging system 200. The illustrated embodiment of the messaging system 200 may particularly correspond to a portion of the messaging servers 110 described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the streaming media system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-Internet-protocol (VoIP) voice communication between messaging endpoints for the performance of VoIP calls.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
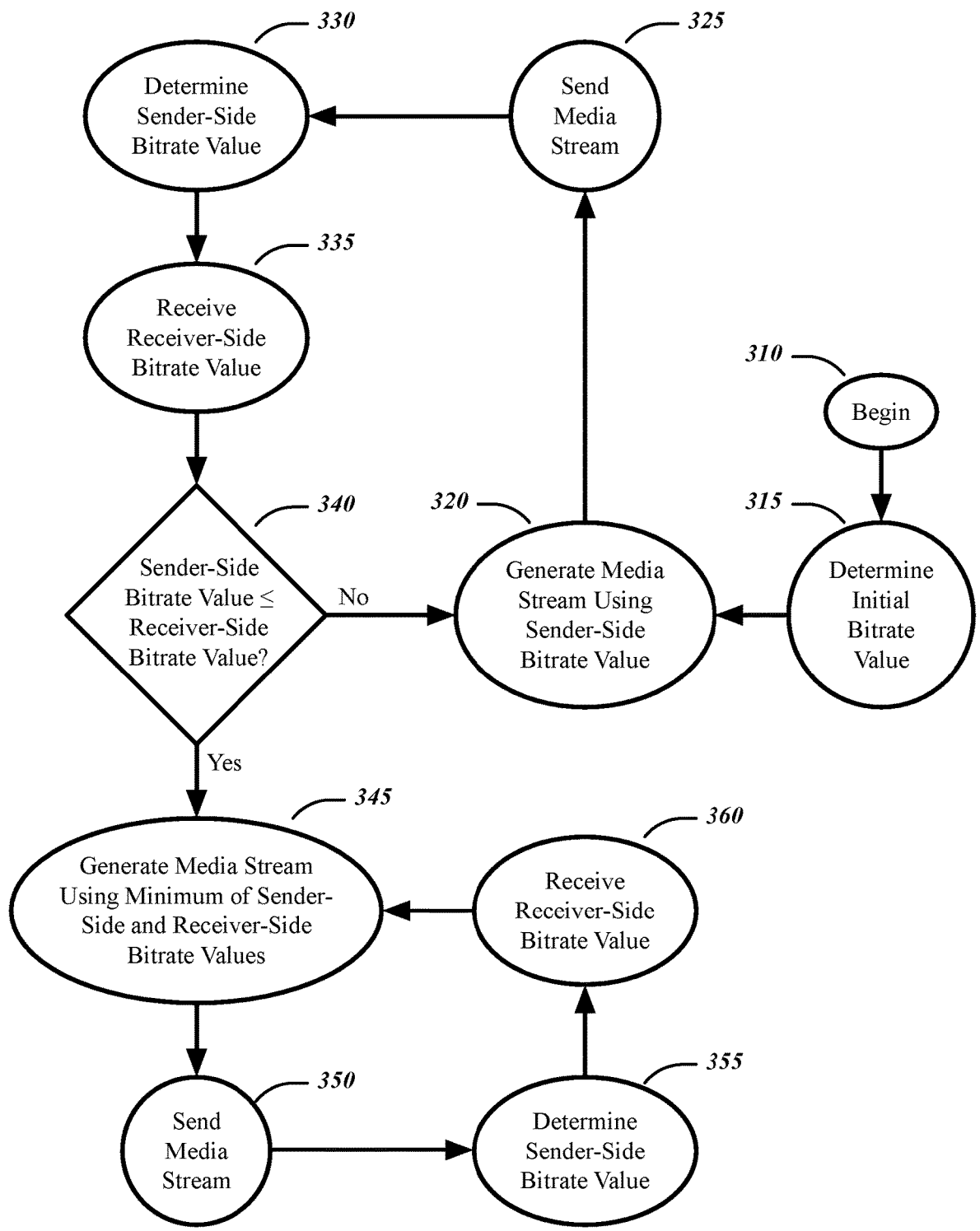
FIG. 3 illustrates an embodiment of a branching logic flow for the system of FIG. 1.

FIG. 3 illustrates an embodiment of a branching logic flow 300 for the streaming media system 100 of FIG. 1.

The logic flow 300 may begin at block 310. The logic flow 300 may begin because of the initiation of a media stream from a sending client device to a receiving client device. The logic flow 300 may then proceed to block 315.

The logic flow 300 may determine an initial bitrate value at block 315. The initiate bitrate value is an assignment of an initial bitrate without use of and independent of network performance information for the media stream due to the media stream having not yet initiated and network performance information therefore not being available. The initial bitrate value may be set as a predefined value, or may make use of general network performance information distinct from specific network performance information for the media stream. The initial bitrate value may comprise an initial sender-side bitrate value, as a receiver-side bitrate value has not yet been received. The logic flow 300 may then proceed to block 320.

The logic flow 300 may generate a media stream using a sender-side bitrate value at block 320. This sender-side bitrate value may comprise an initial bitrate value for starting a media stream or may comprise a bitrate value determined based on sender-side network performance information. Generating the media stream using the sender-side bitrate value may comprise providing the sender-side bitrate value as a target or maximum bitrate value to a hardware or software encoding component encoding the media stream. The logic flow 300 may then proceed to block 325.

The logic flow 300 may send the media stream to a receiving client device at block 325. Sending the media stream to a receiving client device may comprise a network communication performed either directly between the client devices or mediated by a relay server. The logic flow 300 may then proceed to block 330.

The logic flow 300 may determine a sender-side bitrate value at block 330. The logic flow 300 may determine the sender-side bitrate value based on sender-side network performance information. The sender-side bitrate value is calculated to attempt to take advantage of available bandwidth without exceeding it, to the extent that it can be calculated based on network performance information visible to the sending client device. The logic flow 300 may then proceed to block 335.

The logic flow 300 may receive a receiver-side bitrate value at block 335. The receiving client device sends the receiver-side bitrate value to the sending client device to assist in the determination of the bitrate value used in sending the media stream. The receiver-side bitrate value is calculated to attempt to take advantage of available bandwidth without exceeding it, to the extent that it can be calculated based on network performance information visible to the receiving client device. The logic flow 300 may then proceed to block 340.

The logic flow 300 may determine whether the sender-side bitrate value is less than or equal to the receiver-side bitrate value. The logic flow 300 may generally operate in two modes or phases.

In an initial phase, the bitrate value for the media stream may be determined as the sender-side bitrate value. The sender-side bitrate value may be calculated to more aggressively attempt to take advantage of possible additional bandwidth and therefore more aggressively ramp up the bitrate value as compared to the receiver-side bitrate value. During the initial phase, the logic flow 300 repeatedly compares the sender-side bitrate value to the receiver-side bitrate value. As long as the sender-side bitrate value is greater than the receiver-side bitrate value the logic flow 300 remains in the initial phase, such that the logic flow 300 proceeds to block 320 and the continuation of the initial phase.

In a second phase, the bitrate value for the media stream may be determined as the minimum of the sender-side bitrate value and receiver-side bitrate value. Once the media stream has reached an equilibrium point, the logic flow 300 moves into the second phase in which the receiver-side bitrate value is used to temper the aggressive expansion of the sender-side bitrate value. Once the logic flow 300 moves into the second phase it remains in the second phase and never return to the initial phase. If the sender-side bitrate value is less than or equal to the receiver-side bitrate value the logic flow 300 proceeds to block 345 and the second phase.

The logic flow 300 may generate the media stream using a minimum of the sender-side and receiver-side bitrate values at block 345. Generating the media stream using the minimum of the sender-side and receiver-side bitrate values may comprise providing the minimum bitrate value as a target or maximum bitrate value to a hardware or software encoding component encoding the media stream. The logic flow 300 then proceeds to 350.

The logic flow 300 may send the media stream to a receiving client device at block 350. Sending the media stream to a receiving client device at block 350 may be the same as sending the media stream to a receiving client device as described at block 325. The logic flow 300 may then proceed to block 355.

The logic flow 300 may determine a sender-side bitrate value at block 355. Determining the sender-side bitrate value at block 355 may be the same as determining the sender-side bitrate value as described at block 330. The logic flow 300 may then proceed to block 360.

The logic flow 300 may determine a receiver-side bitrate value at block 360. Determining the receiver-side bitrate value at block 360 may be the same as determining the receiver-side bitrate value as described at block 335. The logic flow 300 may then proceed to block 345.

The logic flow 300 may terminate when the sending of the media stream is terminated, such as in response to a user termination of media streaming.

Figure 4:
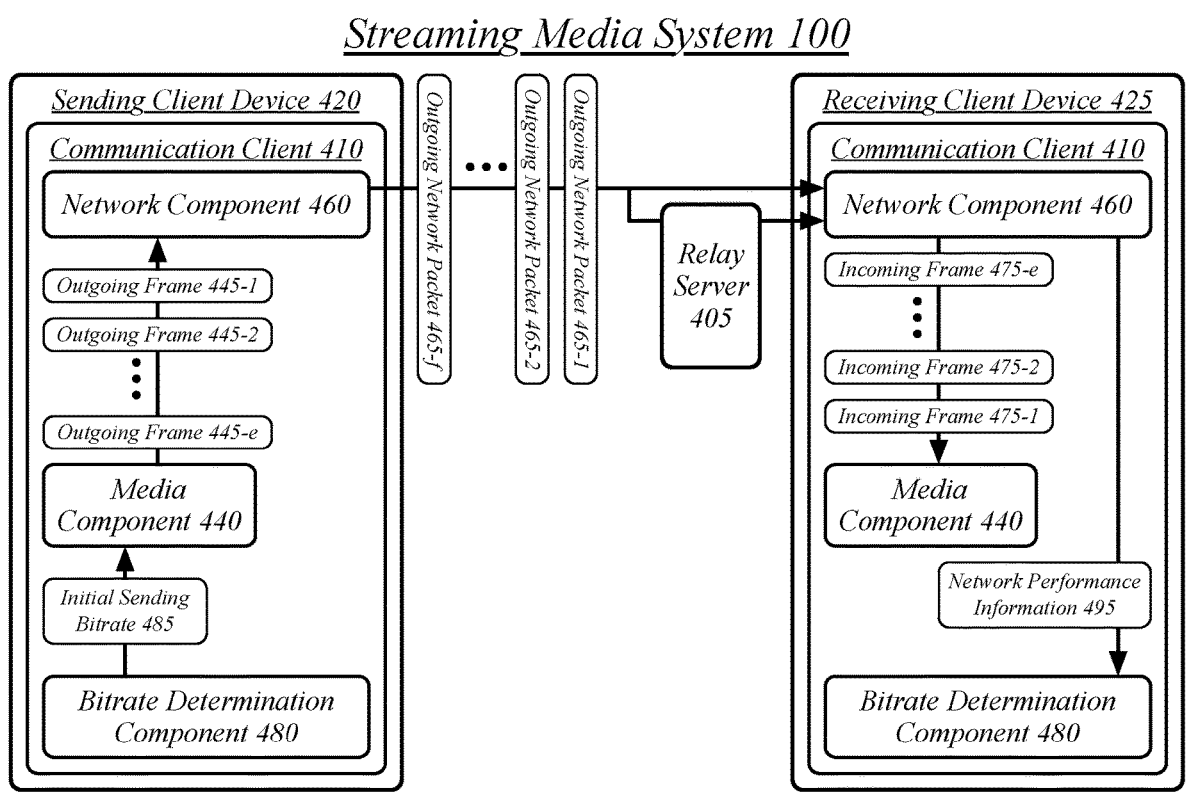
FIG. 4 illustrates an embodiment of a streaming media system with a sending client device sending a sequence of outgoing frames to a receiving client device.

FIG. 4 illustrates an embodiment of a streaming media system 100 with a sending client device 420 sending a sequence of outgoing frames 445 to a receiving client device 425.

A sending client device 420 may engage in a streaming network connection with a receiving client device 425 carrying a media stream. Each of the sending client device 420 and receiving client device 425 may execute an instantiation of a communication client 410. In some cases, the client devices 420, 425 may execute instantiations of different communication clients that conform to a sufficiently common specification to empower interoperability. In some embodiments, the communication client 410 may comprise a messaging client offering media streaming communication services.

In some cases, the streaming network connection may be a direct connection in which the outgoing network packets 465 from the sending client device 420 are addressed to the public-facing address associated with the receiving client device 425 and the outgoing network packets from the receiving client device 425 are addressed to the public-facing address associated with the sending client device 420. In other cases, the streaming network connection may be a relayed connection in which the outgoing network packets from the sending client device 420 and receiving client device 425 are addressed to a relay server 405, with the relay server 405 operative to forward network packets received from one client device to the other client device. A relay server 405 may comprise one relay server of a plurality of relay servers 190 provided as part of a messaging system 110. The relay server 405 may execute on a relay server device.

A communication client 410 may comprise a network component 460, the streaming component generally arranged to establish and carry out the performance of a streaming network connection carrying streaming media content as a media stream. The streaming network connection may comprise a sequence of network packets. A network packet may comprise a user datagram protocol (UDP) or transmission control protocol (TCP) addressed using the internet protocol (IP), thereby forming UDP/IP or TCP/IP packets. In some embodiments, UDP/IP may be preferentially used as it may be preferable to miss a packet than introduce the additional delay of requesting and receiving a replacement to a missed packet.

The communication client 410 may comprise a media component 440. The media component 440 is generally arranged to manage the generation of the media stream using an assigned bitrate value. The media component 440 may interoperate with an encoding component to produce a series of outgoing frames 445. The outgoing frames 445 may comprise audio and/or video frames. An outgoing media frame, such as an audio frame or video frame, may comprise a portion of the media stream over a particular extent of time in which the media content during that period is bundled for decoding as a unit. The encoding component may comprise a hardware encoding component of the sending client device 420. The encoding component may comprise a software encoding component of the communication client 410, the operating system of the sending client device 420, or other software encoding component available to the communication client 410. The media component 440 is operative to generate a media stream at a sending client device 420, the media stream comprising a video stream and an audio stream. The media stream is configured for a sending bitrate. The media stream being configured for the sending bitrate may comprise an assignment of the sending bitrate to the encoding component. In other embodiments, the media component 440 may perform the media encoding and directly generate the outgoing frames 445. The media content for the media stream may be provided, without limitation, by a capture component of the sending client device 420, such as may receive media content from a camera and/or microphone of the sending client device 420.

The communication client 410 may comprise a bitrate determination component 480. The bitrate determination component 480 determines the sending bitrate for use by the media component 440. The bitrate determination component 480 may be generally arranged to determine the sending bitrate based on network performance information for the media stream. The bitrate determination component 480 may, however, determine an initial sending bitrate 485 independent of network performance information due to it not yet being available to the bitrate determination component 480 of the sending client device 420. In some embodiments, the initial sending bitrate 485 may be a predefined initial sending bitrate 485 configured for the communication client 410 independent of any network information. In other embodiments, the initial sending bitrate 485 may be determined based on network information, such as network information indicating the bandwidth available on the network being used by the sending client device 420.

The network component is operative to receive the media stream from the media component and send the media stream, comprising the outgoing frames 445, from the sending client device 420 to the receiving client device 425. The outgoing frames 445 may be sent inside the outgoing network packets 465. Some of the outgoing network packets 465 may contain only one outgoing frame of the plurality of outgoing frames 445. Other outgoing network packets of the plurality of outgoing network packets 465 may contain two or more outgoing frames of the plurality of outgoing frames 445.

The relay server 405 receiving the media stream at the server device from the sending client device 420, with the media stream generated at the sending client device 420, the media stream comprising a video stream and an audio stream, and the media stream configured for a sending bitrate. The relay server 405 sends the media stream to the receiving client device 425.

The network component 460 of the receiving client device 425 receives the media stream in the outgoing network packets 465 from the sending client device 420, via the relay server 405 in some embodiments. The network component 460 extracts the incoming frames 465 for the receiving client device 425, which correspond to the outgoing frames of the sending client device 420, and provides them to the media component 440. It will be appreciated that incoming frames 475 for the receiving client device 425 correspond to the outgoing frames 445 for the sending client device 420.

The media component 440 of the receiving client device 425 receives the incoming frames 475. The media component 440 may then perform the media stream for the user of the receiving client device 425, such as by displaying video content via a display screen for the receiving client device 425 and playing audio content via a speaker or speakers for the receiving client device 425. The media component 440 of the receiving client device 425 may additionally or alternatively store the media content.

The bitrate determination component 480 for the receiving client device 425 receives network performance information 495 for the incoming media stream. The bitrate determination component 480 is generally arranged to use the network performance information 495 to assist the sending client device 420 in encoding and sending the media stream to the receiving client device 425.

In some cases, the receiving client device 425 may also send a media stream to the sending client device 420, such that the network exchange between the client devices 420, 425 is a bidirectional exchange of media streams. Such a bidirectional exchange may comprise a two-way video call. In a bidirectional exchange the components of the client devices 420, 425 may perform both the sending and receiving operations described herein when acting in the respective sending and receiving rolls for each of a sending and receiving media stream for each client device 420, 425.

Figure 5:
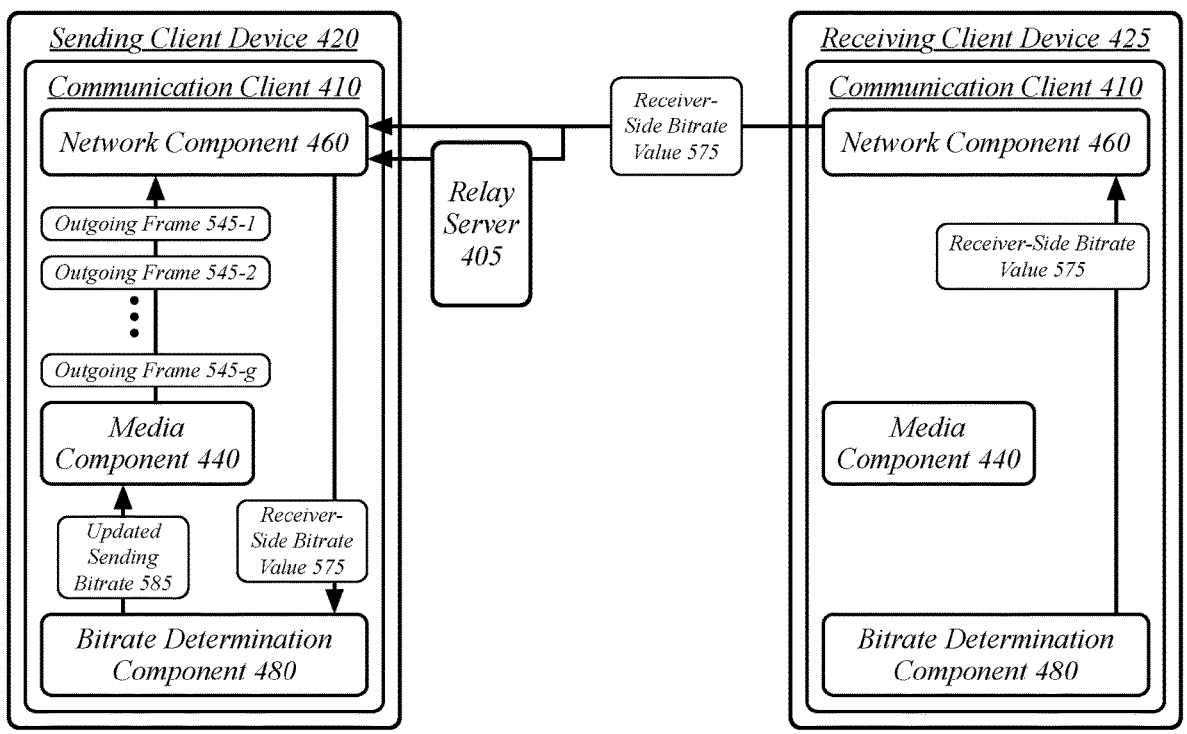
FIG. 5 illustrates an embodiment of a streaming media system with a sending client device using an updated sending bitrate based on a receiver-side bitrate value.

FIG. 5 illustrates an embodiment of a streaming media system 100 with a sending client device 420 using an updated sending bitrate 585 based on a receiver-side bitrate value 575.

The bitrate determination component 480 on the receiving client device 425 generates a receiver-side bitrate value 575. The receiver-side bitrate value 575 is based on the network performance information 495 provided to the bitrate determination component 480 by the network component 460 of the receiving client device 425. The network performance information 495 may comprise one or more performance measures, such as a video network performance measure and an audio network performance measure, comprising a first network performance measure and a second network performance measure.

The video network performance measure may be based on the video stream in isolation from the audio stream, while the audio network performance measure is based on the audio stream in isolation from the video stream. Measuring network performance information 495 for the outgoing network packets 465 from the sending client device 420 may be performed by distinctly measuring the performance of the video stream component and the audio stream component of the media stream. Due to possible differences in the sizes of network packets for the video stream and network packets for the audio stream, and differences in the timing of network packets for the video stream and network packets for the audio stream, network performance measures that track the network packets without distinction between the audio and video streams may produce unreliable results. As such, the network performance information 495 may be divided into audio stream performance information and video stream performance information to generate a distinct video network performance measure and audio network performance measure.

The video network performance measure may comprise an estimate of the video inter-packet-time for the outgoing network packets 465 of the video stream. The audio network performance measure may comprise an estimate of the audio inter-packet time for the outgoing network packets 465 of the audio stream. Each of the network performance measures may comprise a mean and a variance indicating both the estimated inter-packet time and the expected variation from the mean for the estimated inter-packet time. As such, the video network performance measure may comprise a video inter-packet-time mean and video inter-packet-time variance for the video stream, and the audio network performance measure may comprise an audio inter-packet-time mean and audio inter-packet-time variance for the audio stream.

The video network performance measure and audio network performance measure may be calculated based on Kalman filters. A Kalman filter calculation is made based on a sequence of measured video inter-packet times for the video stream, with the sequence of measured video inter-packet times being the measured time between network packets for the video stream component of the media stream, to generate the video inter-packet-time mean and video inter-packet-time variance. Similarly, a Kalman filter calculation is made based on a sequence of measured audio inter-packet times for the audio stream, with the sequence of measured audio inter-packet times being the measured time between network packets for the audio stream component of the media stream, to generate the audio inter-packet-time mean and audio inter-packet-time variance. It will be appreciated that other filters may be used. In general, the video network performance measure and the audio network performance measure may be based on various statistical distributions, such as one of a Poisson distribution and a Gaussian distribution, to estimate the mean and variance for the inter-packet-times for the video and audio streams.

The video inter-packet-time mean and audio inter-packet-time mean may be combined into a combined inter-packet time value. The video inter-packet-time mean and audio inter-packet-time mean may be combined via a weighted average into a weighted inter-packet time value. The inter-packet-time means may be weighted for averaging based on the inverse of the inter-packet-time variances (i.e., the numerical inverse in which the variance is raised to a power of negative one). As such, the video inter-packet-time mean is weighted using an inverse of the video inter-packet-time variance and the audio inter-packet-time mean is weighted using an inverse of the audio inter-packet-time variance in combining the video inter-packet-time mean and audio inter-packet-time mean into the weighted inter-packet time value. The receiver-side bitrate value 575 is then based on combining the video inter-packet-time mean and audio inter-packet-time mean into a weighted inter-packet time value.

The receiver-side bitrate value 575 may be based on whether the weighted inter-packet time value is increasing according to a comparison of the weighted inter-packet time value with a previous weighted inter-packet time value. The outgoing receiver-side bitrate value 575 is set to be smaller than the immediately-previous receiver-side bitrate value when a current weighted inter-packet time value is larger than an immediately-previous weighted inter-packet time value, indicating that the network connection between the sending client device 420 and receiving client device 425 is being saturated. Similarly, the outgoing receiver-side bitrate value 575 is set to be larger than the immediately-previous receiver-side bitrate value when a current weighted inter-packet time value is smaller than an immediately-previous weighted inter-packet time value, indicating that more bandwidth may be available. The bitrate determination component 480 may use a slower rate of increase for the receiver-side bitrate value than it does for the sender-side bitrate value in order to avoid overloading the connection. The bitrate determination component 480 may use a linear or constant increase when increasing the receiver-side bitrate value 575 instead of an exponential increase, as may be used with a sender-side bitrate value.

Additional network performance measures may be used in calculating the receiver-side bitrate value 575. The receiver-side bitrate value 575 may be determined by combining the weighted inter-packet time value with a packet-size value and round-trip time value. The weighted inter-packet time value, packet-size value, and round-trip time value may be used to calculate an estimate of the bandwidth available on the network path from the sending client device 420 to the receiving client device 425. This estimate of the bandwidth available is then used as the receiver-side bitrate value 475.

The receiver-side bitrate value 575 is sent to the communication client 410 of the sending client device 420. The bitrate determination component 480 sends the receiver-side bitrate value 575 to the sending client device 420 using the network component 460 of the receiving client device 425. The receiver-side bitrate value 575 may be sent via the relay server 405 where the network connection between the client devices 420, 425 uses relay server services.

The relay server 405 receives the receiver-side bitrate value from the receiving client device 425, the receiver-side bitrate value based on a first network performance measure and a second network performance measure, the first network performance measure based on the video stream in isolation from the audio stream, the second network performance based on the audio stream in isolation from the video stream. The relay server 405 then sends the receiver-side bitrate value to the sending client device 420.

The bitrate determination component 480 of the communication client 410 on the sending client device 420 then receives the receiver-side bitrate value 575 from the receiving client device 425, via the relay server 405 in some embodiments.

The bitrate determination component 480 of the sending client device 420 determines a sender-side bitrate value based on sender-side network performance information. The bitrate determination component 480 may determine the sender-side bitrate value based on a packet loss percentage and round-trip time value for the media stream. The bitrate determination component 480 may rapidly, such as exponentially, increase the sender-side bitrate value while the packet loss percentage remains low, or does not increase, and while the round-trip time value does not increase beyond an expected random variation. The bitrate determination component 480 then determines the sending bitrate based on the sender-side bitrate value and the receiver-side bitrate value 575.

Over the course of the media stream, the bitrate determination component 480 receives a sequence of receiver-side bitrate values and determines a sequence of sender-side bitrate values. In an initial period, the bitrate determination component 480 may determine the sending bitrate based exclusively on the sender-side bitrate values, with the receiver-side bitrate values being compared to the sender-side bitrate values, but not included in the direct numerical calculation of the sending bitrate during this initial period. Instead, in the initial period the sending bitrate is determined as the sender-side bitrate value.

In a second period, the bitrate determination component 480 may determine the sending bitrate in a second period based on a minimum of the sender-side bitrate values and the receiver-side bitrate values. This second period is begun once a determined sender-side bitrate value of the sequence of sender-side bitrate values is equal or lesser to a received receiver-side bitrate value of the sequence of receiver-side bitrate values. This second period is maintained through the remaining duration of the media stream, reflecting the more stable state expected of the network connection after the more aggressive expansion of the sending bitrate during the initial period in which the communication clients attempt to find the maximum stable bandwidth that they can use for the media stream.

The bitrate determination component 480 provides an updated sending bitrate 585 to the media component 440, the updated sending bitrate 585 based on the receiver-side bitrate value 575. The media component 440 is then operative to continue generation of the media stream, with the media stream now generated using the updated sending bitrate 585. As the updated sending bitrate 585 is determined based on the comparison between the most-recent receiver-side bitrate value 575 and the most recent sender-side bitrate value, the media component 440 is therefore modifying the sending bitrate based on the receiver-side bitrate value 575 received from the receiving client device 425. The further outgoing frames 545, which are sent via further outgoing network packets, are encoded using this updated sending bitrate 585.

The network component 460 of the sending client device 420 sends the media stream to the receiving client device 425. Where the relay server 405 is used in relay communication between the client device 420, 425, the relay server 405 receives the media stream from the sending client device 420 at an updated sending bitrate based on the receiver-side bitrate value and sends the media stream at the updated sending bitrate to the receiving client device 425. The network component 460 of the receiving client device 425 receives the media stream and provides it to the media component 420 for playback to the user.

Figure 6:
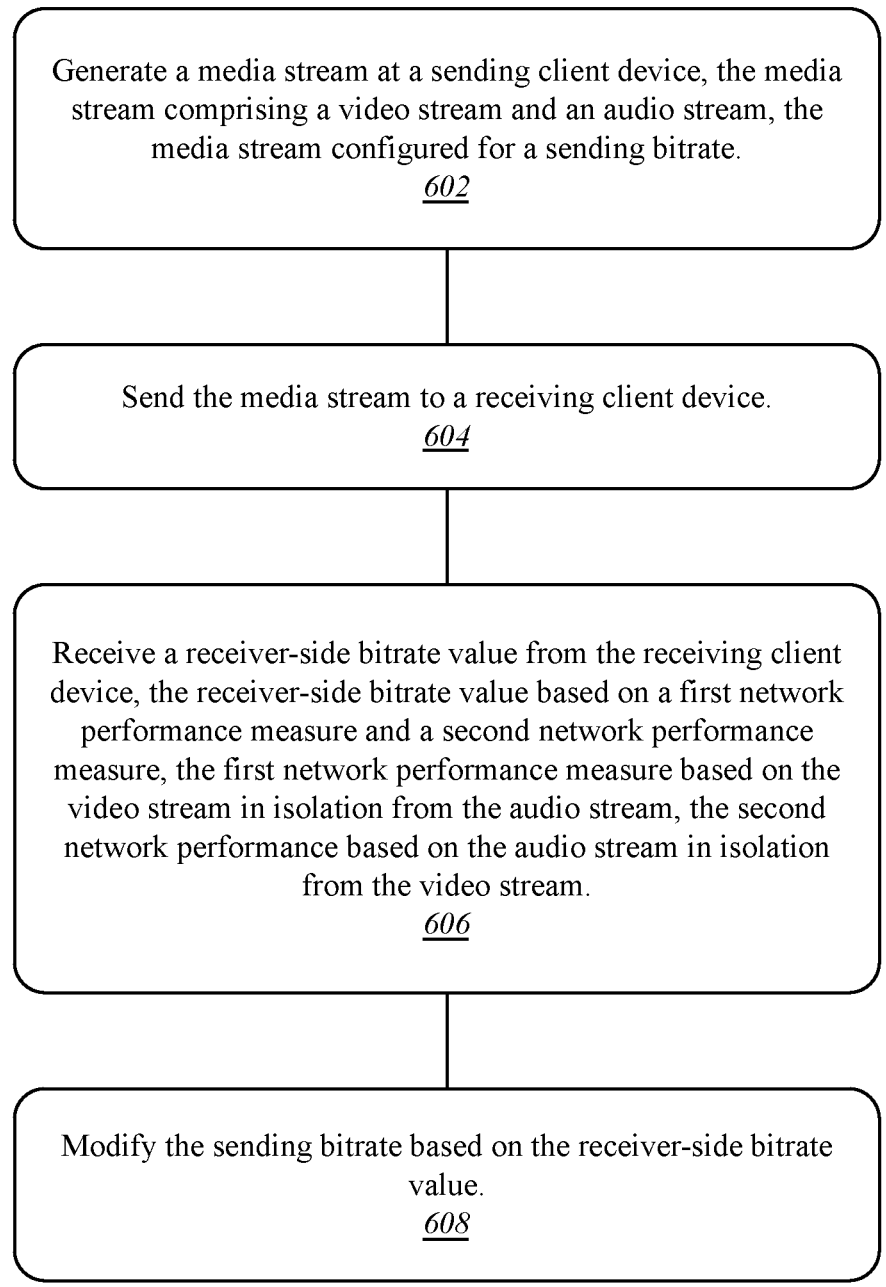
FIG. 6 illustrates an embodiment of a logic flow for the system of FIG. 1.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may generate a media stream at a sending client device, the media stream comprising a video stream and an audio stream, the media stream configured for a sending bitrate at block 602.

The logic flow 600 may send the media stream to a receiving client device at block 604.

The logic flow 600 may receive a receiver-side bitrate value from the receiving client device, the receiver-side bitrate value based on a first network performance measure and a second network performance measure, the first network performance measure based on the video stream in isolation from the audio stream, the second network performance based on the audio stream in isolation from the video stream at block 606.

The logic flow 600 may modify the sending bitrate based on the receiver-side bitrate value at block 608.

The embodiments are not limited to this example.

Figure 7:
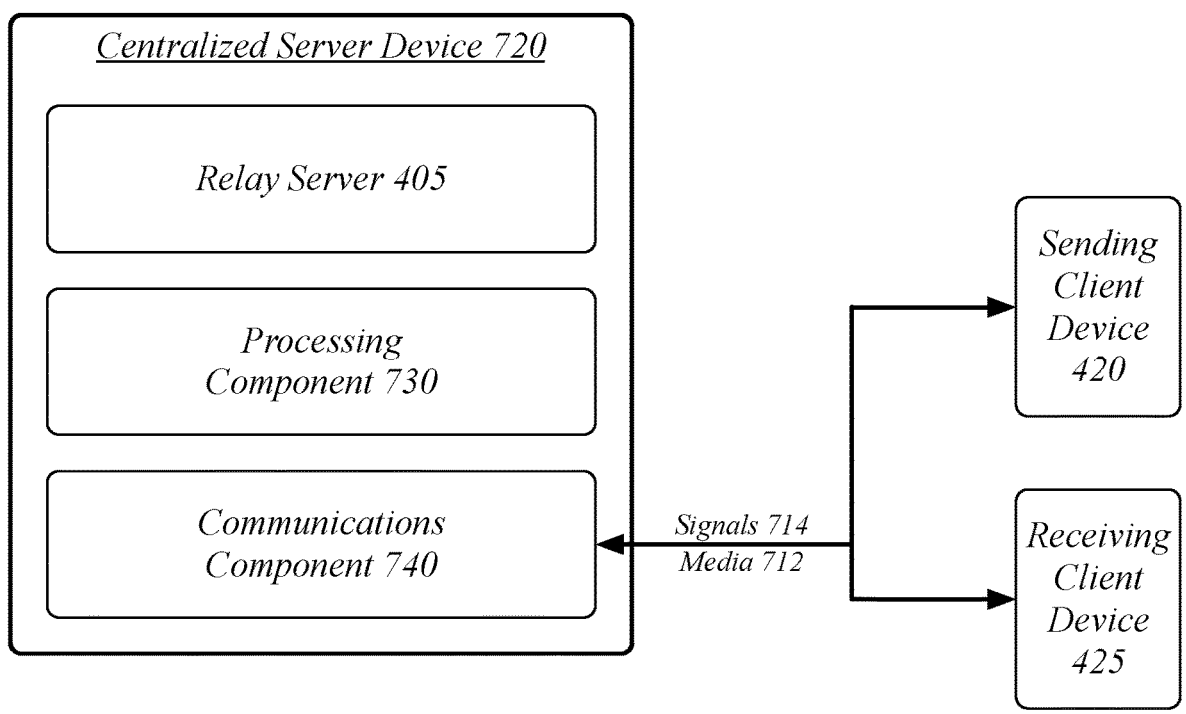
FIG. 7 illustrates an embodiment of a centralized system for the system of FIG. 1.

FIG. 7 illustrates a block diagram of a centralized system 700. The centralized system 700 may implement some or all of the structure and/or operations for the streaming media system 100 in a single computing entity, such as entirely within a single centralized server device 720.

The centralized server device 720 may comprise any electronic device capable of receiving, processing, and sending information for the streaming media system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the streaming media system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the streaming media system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices over a communications media 712 using communications signals 714 via the communications component 740. The centralized server device 720 may execute a relay server 405, the relay server 405 operative to assist in the performance of streaming network connections. The relay server 405 may receive and forward network packets between the sending client device 420 and receiving client device 425 as assistance to the performance of a streaming network connection, the receiving and forwarding of network packets comprising at least a portion of the signals 714 transmitted via media 712.

Figure 8:
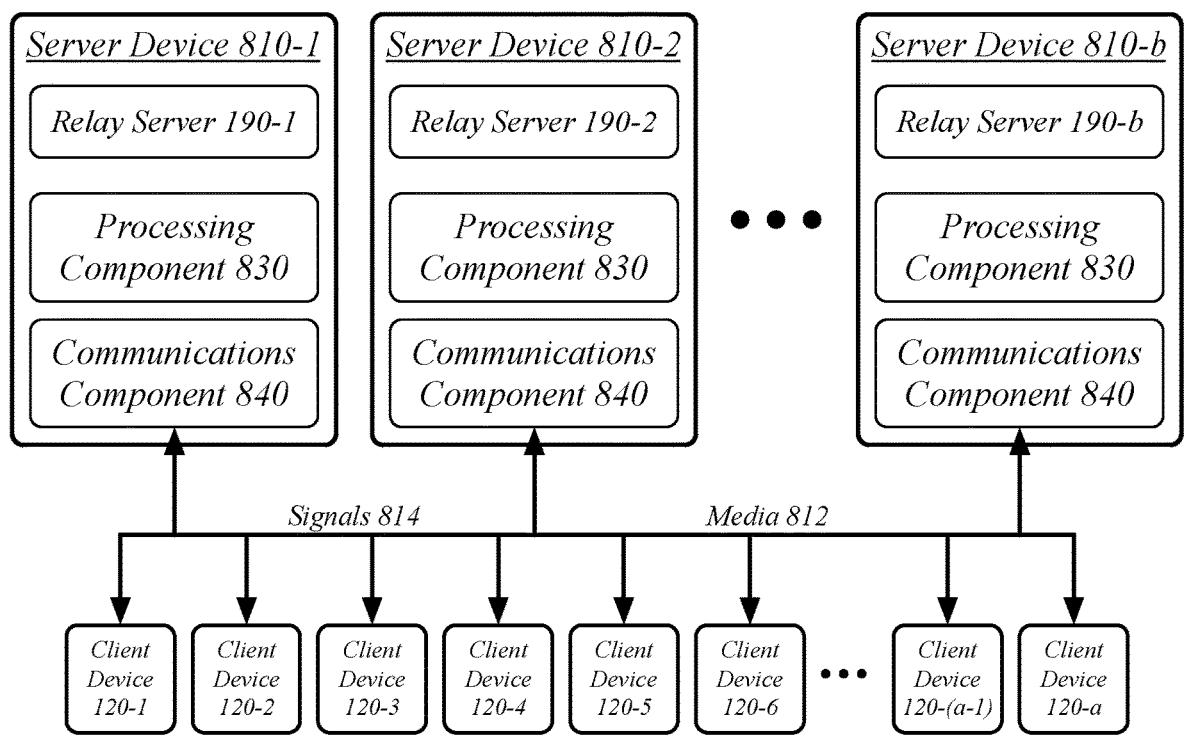
FIG. 8 illustrates an embodiment of a distributed system for the system of FIG. 1.

FIG. 8 illustrates a block diagram of a distributed system 800. The distributed system 800 may distribute portions of the structure and/or operations for the streaming media system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of server devices 810. In general, the server devices 810 may be the same or similar to the centralized server device 710 as described with reference to FIG. 7. For instance, the server devices 810, 850 may each comprise a processing component 830 and a communications component 840 which are the same or similar to the processing component 730 and the communications component 740, respectively, as described with reference to FIG. 7. In another example, the server devices 810, 850 may communicate over a communications media 812 using communications signals 814 via the communications components 840.

The server devices 810 may comprise or employ one or more programs that operate to perform various methodologies in accordance with the described embodiments. In one embodiment, for example, the server devices 810 may each implement a relay server of a plurality of relay servers 190, as described with reference to FIG. 1.

Figure 9:
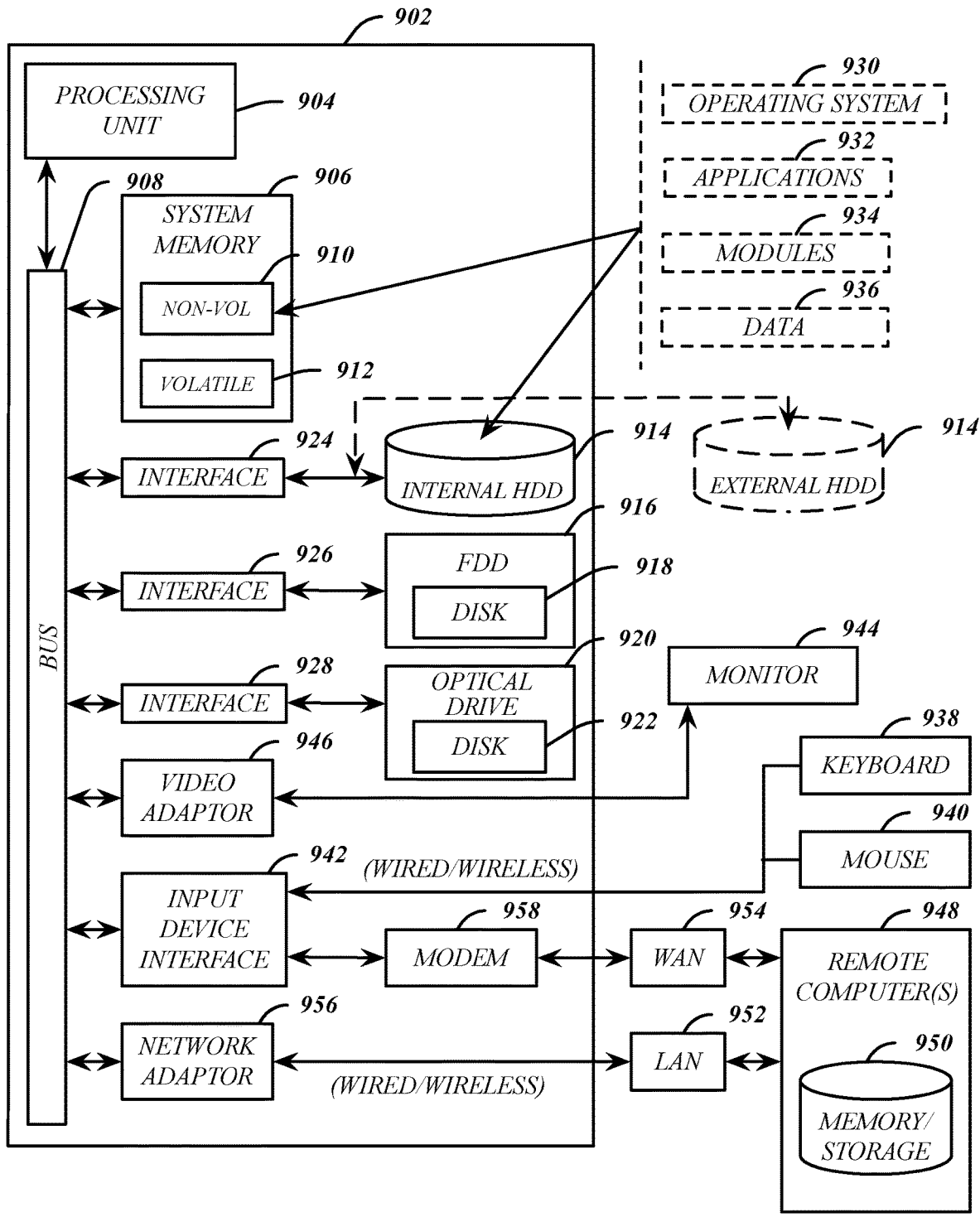
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the streaming media system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
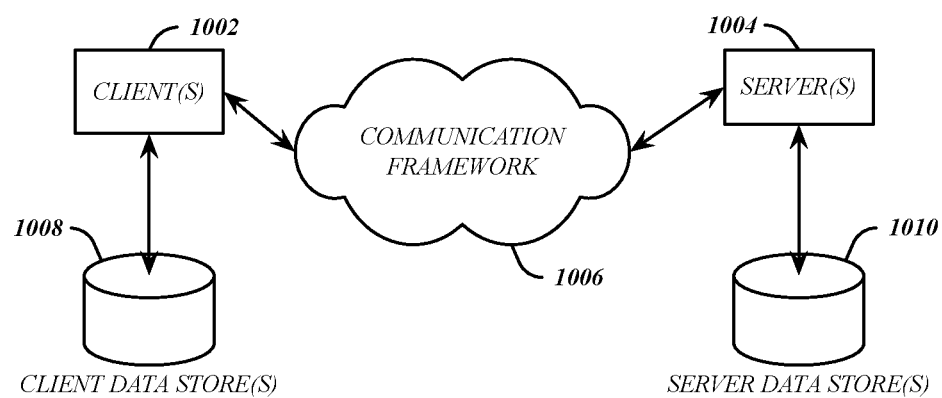
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the communication clients, such as communication client 410. The servers 1004 may implement the relay servers, such as relay servers 190 and relay server 405. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
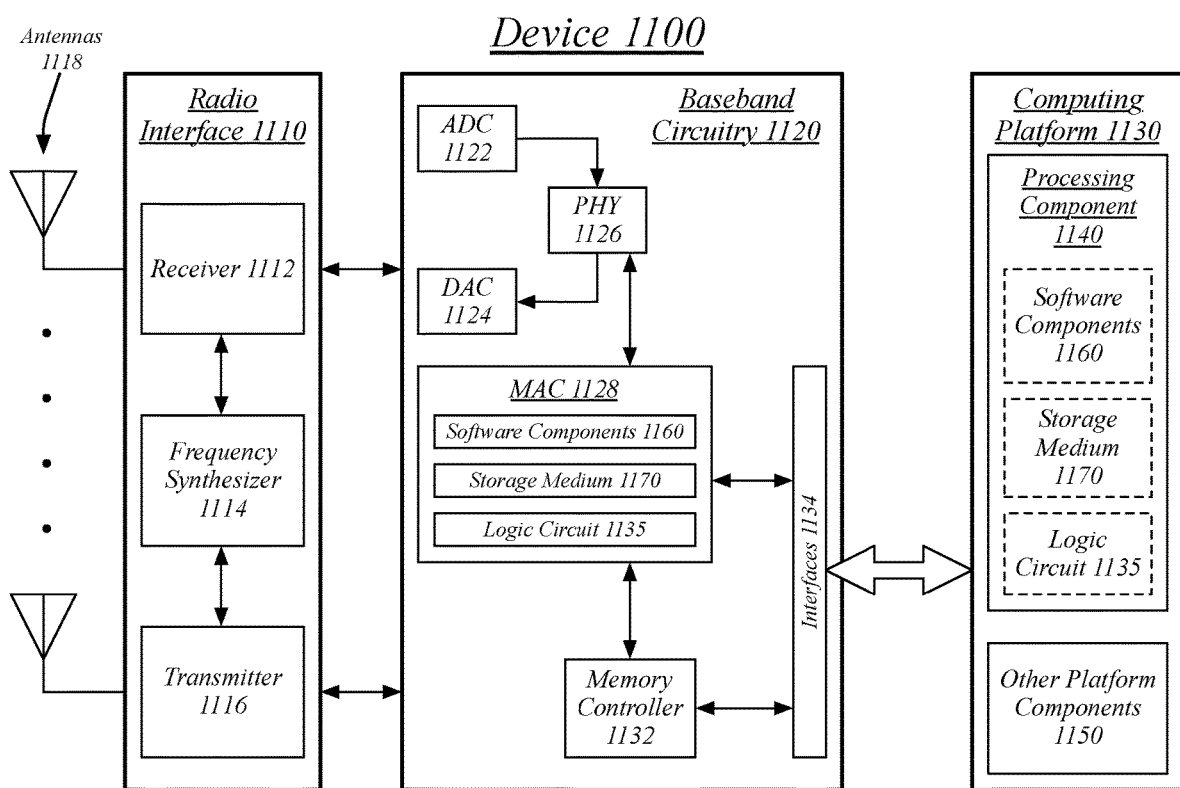
FIG. 11 illustrates an embodiment of a radio device architecture.

FIG. 11 illustrates an embodiment of a device 1100 for use in a multicarrier OFDM system, such as the streaming media system 100. Device 1100 may implement, for example, software components 1160 as described with reference to streaming media system 100 and/or a logic circuit 1135. The logic circuit 1135 may include physical circuits to perform operations described for the streaming media system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the streaming media system 100 and/or logic circuit 1135 in a single computing entity, such as entirely within a single device. Alternatively, the device 1100 may distribute portions of the structure and/or operations for the streaming media system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the streaming media system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a media stream at a server device from a sending client device, the media stream generated at the sending client device, the media stream comprising a video stream and an audio stream, the media stream configured for a sending bitrate; sending the media stream to a receiving client device; receiving a receiver-side bitrate value from the receiving client device, the receiver-side bitrate value based on a first network performance measure and a second network performance measure, the first network performance measure based on the video stream in isolation from the audio stream, the second network performance based on the audio stream in isolation from the video stream; sending the receiver-side bitrate value to the sending client device; and receiving the media stream from the sending client device at an updated sending bitrate based on the receiver-side bitrate value.

A computer-implemented method may comprise generating a media stream at a sending client device, the media stream comprising a video stream and an audio stream, the media stream configured for a sending bitrate; sending the media stream to a receiving client device; receiving a receiver-side bitrate value from the receiving client device, the receiver-side bitrate value based on a first network performance measure and a second network performance measure, the first network performance measure based on the video stream in isolation from the audio stream, the second network performance based on the audio stream in isolation from the video stream; and modifying the sending bitrate based on the receiver-side bitrate value.

A computer-implemented method may further comprise the first network performance measure and the second network performance measure based on Kalman filters.

A computer-implemented method may further comprise the first network performance measure and the second network performance measure based on one of a Poisson distribution and a Gaussian distribution.

A computer-implemented method may further comprise the first network performance measure comprising a video inter-packet-time mean and video inter-packet-time variance for the video stream, the second network performance measure comprising an audio inter-packet-time mean and audio inter-packet-time variance for the audio stream.

A computer-implemented method may further comprise the receiver-side bitrate value based on combining the video inter-packet-time mean and audio inter-packet-time mean into a weighted inter-packet time value, wherein the video inter-packet-time mean is weighted using an inverse of the video inter-packet-time variance and the audio inter-packet-time mean is weighted using an inverse of the audio inter-packet-time variance in combining the video inter-packet-time mean and audio inter-packet-time mean into the weighted inter-packet time value.

A computer-implemented method may further comprise the receiver-side bitrate value based on whether the weighted inter-packet time value is increasing according to a comparison of the weighted inter-packet time value with a previous weighted inter-packet time value.

A computer-implemented method may further comprise the receiver-side bitrate value determined by combining the weighted inter-packet time value with a packet-size value and round-trip time value.

A computer-implemented method may further comprise determining a sender-side bitrate value based on a packet loss percentage and round-trip time value for the media stream; and determining the sending bitrate based on the sender-side bitrate value and the receiver-side bitrate value.

A computer-implemented method may further comprise receiving a sequence of receiver-side bitrate values; determining a sequence of sender-side bitrate values; determining the sending bitrate in an initial period based on the sender-side bitrate values; and determining the sending bitrate in a second period based on a minimum of the sender-side bitrate values and the receiver-side bitrate values, wherein the second period is begun once a determined sender-side bitrate value of the sequence of sender-side bitrate values is equal or lesser to a received receiver-side bitrate value of the sequence of receiver-side bitrate values.

An apparatus may comprise a media component operative to generate a media stream at a sending client device, the media stream comprising a video stream and an audio stream, the media stream configured for a sending bitrate; and modifying the sending bitrate based on a receiver-side bitrate value; a network component operative to send the media stream to a receiving client device; and a bitrate determination component operative to receive the receiver-side bitrate value from the receiving client device, the receiver-side bitrate value based on a first network performance measure and a second network performance measure, the first network performance measure based on the video stream in isolation from the audio stream, the second network performance measure based on the audio stream in isolation from the video stream. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. At least one non-transitory computer-readable storage medium comprising instructions that, when executed, cause a system to:
   generate a media stream at a sending client device, the media stream comprising a video stream and an audio stream, the media stream configured for a sending bitrate;
   send the media stream to a receiving client device;
   receive a receiver-side bitrate value from the receiving client device, the receiver-side bitrate value based on a first network performance measure comprising a video inter-packet-time mean and video inter-packet-time variance for the video stream and a second network performance measure comprising an audio inter-packet-time mean and audio inter-packet-time variance for the audio stream, the first network performance measure based on the video stream in isolation from the audio stream, the second network performance measure based on the audio stream in isolation from the video stream;
   combine, by the sending client device, the video inter-packet-time mean and the audio inter-packet-time mean into a weighted inter-packet time value based on: (i) a computed inverse of the video inter-packet-time variance applied to the video inter-packet-time mean, and (ii) a computed inverse of the audio inter-packet-time variance applied to the audio inter-packet-time mean; and
   modify the sending bitrate based on the weighted inter-packet time value.

2. The computer-readable storage medium of claim 1, the video inter-packet-time mean and video inter-packet-time variance for the video stream based on sending video frames of the video stream via a network, the audio inter-packet-time mean and audio inter-packet-time variance for the audio stream based on sending audio frames of the audio stream via the network.

3. The computer-readable storage medium of claim 2, the receiver-side bitrate value based on whether the weighted inter-packet time value is increasing according to a comparison of the weighted inter-packet time value with a previous weighted inter-packet time value.

4. The computer-readable storage medium of claim 2, the receiver-side bitrate value determined by combining the weighted inter-packet time value with a packet-size value and round-trip time value.

5. The computer-readable storage medium of claim 1, comprising further instructions that, when executed, cause a system to:
   determine a sender-side bitrate value based on a packet loss percentage and round-trip time value for the media stream; and determine the sending bitrate based on the sender-side bitrate value and the receiver-side bitrate value.

6. The computer-readable storage medium of claim 5, comprising further instructions that, when executed, cause a system to:
receive a sequence of receiver-side bitrate values;
determine a sequence of sender-side bitrate values;
determine the sending bitrate in an initial period based on the sequence of sender-side bitrate values;
upon determining a first sender-side bitrate value of the sequence of sender-side bitrate values is less than or equal to a first receiver-side bitrate value of the sequence of receiver-side bitrate values:
determine the sending bitrate in a second period based on a minimum of the sequence of sender-side bitrate values and the sequence of receiver-side bitrate values;
upon determining the first sender-side bitrate value is greater than the first receiver-side bitrate value:
determine the sending bitrate in the second period based on the sending bitrate in the initial period; and
send the media stream in the second period according to the determined sending bitrate in the second period.

7. The computer-readable storage medium of claim 1, the first network performance measure and the second network performance measure based on Kalman filters.

8. The computer-readable storage medium of claim 1, the first network performance measure and the second network performance measure based on one of a Poisson distribution and a Gaussian distribution.

9. An apparatus, comprising:
a processor; and
a memory storing instructions which when executed by the processor cause the processor to:
generate a media stream at a sending client device, the media stream comprising a video stream and an audio stream, the media stream configured for a sending bitrate; send the media stream to a receiving client device;
receive a receiver-side bitrate value from the receiving client device, the receiver-side bitrate value based on a first network performance measure comprising a video inter-packet-time mean and video inter-packet-time variance for the video stream and a second network performance measure comprising an audio inter-packet-time mean and audio inter-packet-time variance for the audio stream, the first network performance measure based on the video stream in isolation from the audio stream, the second network performance measure based on the audio stream in isolation from the video stream;
combine the video inter-packet-time mean and the audio inter-packet-time mean into a weighted inter-packet time value based on: (i) a computed inverse of the video inter-packet-time variance applied to the video inter-packet: time mean, and (ii) a computed inverse of the audio inter-packet-time variance applied to the audio inter-packet-time mean; and
modify the sending bitrate based on the weighted inter-packet time value.

10. The apparatus of claim 9, the video inter-packet-time mean and video inter-packet-time variance for the video stream based on sending video frames of the video stream via a network, the audio inter-packet-time mean and audio inter-packet-time variance for the audio stream based on sending audio frames of the audio stream via the network.

11. The apparatus of claim 10, the receiver-side bitrate value based on whether the weighted inter-packet time value is increasing according to a comparison of the weighted inter-packet time value with a previous weighted inter-packet time value.

12. The apparatus of claim 10, the receiver-side bitrate value determined by combining the weighted inter-packet time value with a packet-size value and round-trip time value.

13. The apparatus of claim 9, the memory further storing instructions which when executed by the processor cause the processor to:
determine a sender-side bitrate value based on a packet loss percentage and round-trip time value for the media stream; and
determine the sending bitrate based on the sender-side bitrate value and the receiver-side bitrate value.

14. The apparatus of claim 13, the memory further storing instructions which when executed by the processor cause the processor to:
receive a sequence of receiver-side bitrate values;
determine a sequence of sender-side bitrate values;
determine the sending bitrate in an initial period based on the sequence of sender-side bitrate values;
upon determining a first sender-side bitrate value of the sequence of sender-side bitrate values is less than or equal to a first receiver-side bitrate value of the sequence of receiver-side bitrate values:
determine the sending bitrate in a second period based on a minimum of the sequence of sender-side bitrate values and the sequence of receiver-side bitrate values;
upon determining the first sender-side bitrate value is greater than the first receiver-side bitrate value:
determine the sending bitrate in the second period based on the sending bitrate in the initial period; and
send the media stream in the second period according to the determined sending bitrate in the second period.

15. A computer-implemented method, comprising:
receiving a media stream at a server device from a sending client device, the media stream generated at the sending client device, the media stream comprising a video stream and an audio stream, the media stream configured for a sending bitrate;
sending the media stream to a receiving client device;
receiving a receiver-side bitrate value from the receiving client device, the receiver-side bitrate value based on a first network performance measure comprising a video inter-packet-time mean and video inter-packet-time variance for the video stream and a second network performance measure comprising an audio inter-packet-time mean and audio inter-packet-time variance for the audio stream, the first network performance measure based on the video stream in isolation from the audio stream, the second network performance measure based on the audio stream in isolation from the video stream;
combining the video inter-packet-time mean and the audio inter-packet-time mean into a weighted inter-packet time value based on: (i) applying a computed inverse of the video inter-packet-time variance to the video inter-packet-time mean, and (ii) applying a computed inverse of the audio inter-packet-time variance to the audio inter-packet-time mean;
sending the weighted inter-packet time value to the sending client device; and receiving the media stream from the sending client device at an updated sending bitrate based on the weighted inter-packet time value.

16. The method of claim 15, the video inter-packet-time mean and video inter-packet-time variance for the video stream based on sending video frames of the video stream via a network, the audio inter-packet-time mean and audio inter-packet-time variance for the audio stream based on sending audio frames of the audio stream via the network, the method further comprising, prior to sending the media stream to the receiving client device:
   determining an initial sending bitrate as the sending bitrate, wherein the initial sending bitrate is determined prior to receiving the receiver-side bitrate value, wherein the initial sending bitrate is determined without considering the receiver-side bitrate value, the first network performance measure, and the second network performance measure.

17. The method of claim 16, the receiver-side bitrate value based on whether the weighted inter-packet time value is increasing according to a comparison of the weighted inter-packet time value with a previous weighted inter-packet time value.

18. The method of claim 16, the receiver-side bitrate value determined by combining the weighted inter-packet time value with a packet-size value and round-trip time value.

19. The method of claim 15, further comprising:
   receiving a sequence of receiver-side bitrate values;
   determining a sequence of sender-side bitrate values;
   determining the sending bitrate in an initial period based on the sequence of sender-side bitrate values;
   upon determining a first sender-side bitrate value of the sequence of sender-side bitrate values is less than or equal to a first receiver-side bitrate value of the sequence of receiver-side bitrate values:
      determining the sending bitrate in a second period based on a minimum of the sequence of sender-side bitrate values and the sequence of receiver-side bitrate values;
   upon determining the first sender-side bitrate value is greater than the first receiver-side bitrate value:
      determining the sending bitrate in the second period based on the sending bitrate in the initial period; and
   sending the media stream in the second period according to the determined sending bitrate in the second period.

* * * * *